(No Model.)
G. B. NICHOLS.
WEATHER AND FIRE STRIP FOR BOX CAR DOORS.
No. 279,420. Patented June 12, 1883.
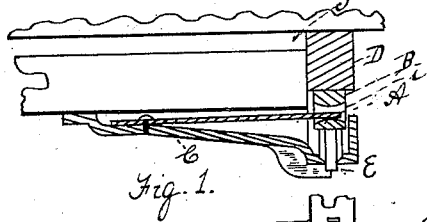
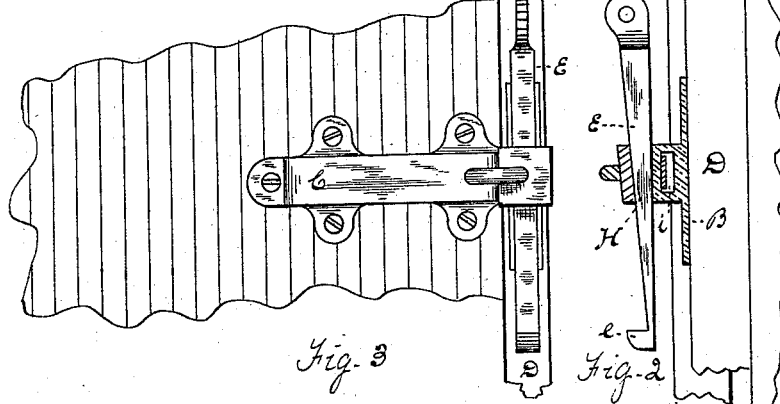
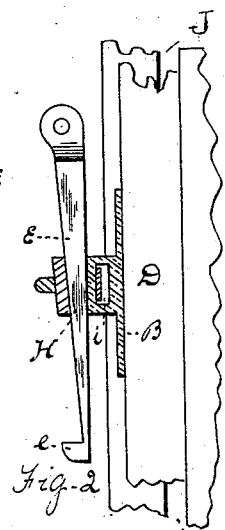
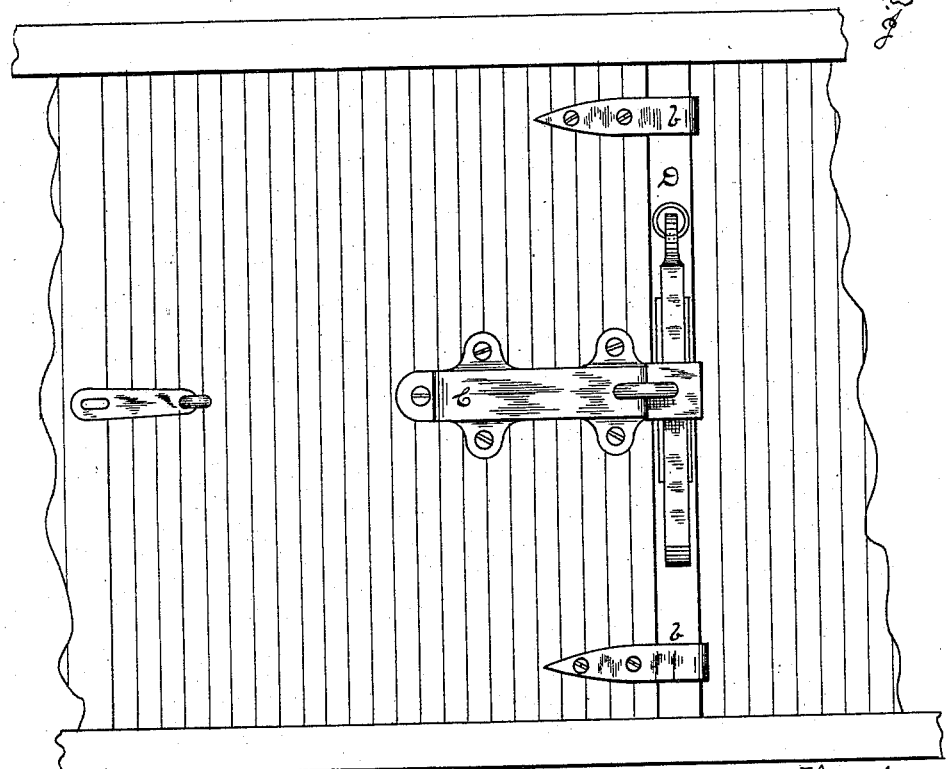
Witnesses
Jno. K. Smith
L. C. Fitler
Inventor
George B. Nichols
by his attorneys
Bakewell & Kerr

UNITED STATES PATENT OFFICE.

GEORGE B. NICHOLS, OF GALVESTON, TEXAS.

WEATHER AND FIRE STRIP FOR BOX-CAR DOORS.

SPECIFICATION forming part of Letters Patent No. 279,420, dated June 12, 1883.

Application filed October 20, 1882. (No model.)

*To all whom it may concern:*

Be it known that I, GEORGE B. NICHOLS, of Galveston, in the county of Galveston and State of Texas, have invented a new and useful Improvement in Weather and Fire Strips for Box-Car Doors; and I do hereby declare the following to be a full, clear, and exact description thereof.

My invention relates to an improved device for closing the space between the rear edge of the doors of box-cars and the side of the car, so as to prevent sparks or water from entering through the space and damaging the goods in the car.

I will now describe my invention, so that others skilled in the art may manufacture and use the same, reference being had to the accompanying drawings, forming a part of this specification, in which—

Figure 1 is a cross-section of the movable strip and locking device. Fig. 2 is a vertical section of the same. Fig. 3 is a side elevation, and Fig. 4 is a side elevation showing the manner of securing the strip to the door.

Like letters of reference indicate like parts wherever they occur.

In the drawings, D represents the movable strip, which is of about the same thickness as the car-door, and is movably secured to the rear edge of the same by the brackets $b$, so that the strip may be moved toward and against the side of the car, so as to close the space J, and drawn back again, so as not to interfere with the movement of the door.

Attached to the face of the strip D is a lug, B, in which is a slot, $i$, through which the free end of a bar-spring, A, passes and engages. The other end of this spring A is secured in and to the casing C, which casing is secured to the side of the car-door and projects over the strip D and lug B.

Between the inner surface of the casing C and the outer end of the lug B is a wedge, E, which is provided with an enlargement, $e$, at its smaller end to prevent its being withdrawn from the space H between the casing C and lug B.

The operation is as follows: When the car-door is shut the wedge E is pushed down between the casing C and lug B, which forces the strip D tightly against the side of the car and completely closes the space J. When it is necessary to open the door of the car the wedge E is drawn up and the spring A carries the strip D to its first position along the edge of the door away from the side of the car, so that the door may be easily moved.

Having thus described my invention, what I claim, and desire to secure by Letters Patent, is—

1. In combination with a car-door, a movable strip, a spring for preserving the strip in line with the door, and a wedge for forcing the strip out of line with the door, substantially as and for the purpose specified.

2. In combination with a car-door, a movable strip attached to the rear edge of the door, provided with a locking device and spring, substantially as and for the purpose specified.

3. In combination with a car-door, a movable strip secured to the rear edge of the door, a slotted lug engaging with a spring, a casing, and wedge, all combined substantially as and for the purpose specified.

In testimony whereof I have hereunto set my hand this 14th day of October, A. D. 1882.

GEORGE B. NICHOLS.

Witnesses:
AUGUST C. STREMMEL,
WILLIAM A. WOOD.